(12) United States Patent
Jin et al.

(10) Patent No.: US 9,420,350 B2
(45) Date of Patent: Aug. 16, 2016

(54) METHOD AND APPARATUS FOR PROVIDING A REMOTE USER INTERFACE

(75) Inventors: Ho Jin, Yongin-si (KR); Young-Chul Sohn, Seoul (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 1287 days.

(21) Appl. No.: 13/376,670

(22) PCT Filed: Jun. 8, 2010

(86) PCT No.: PCT/KR2010/003647
§ 371 (c)(1),
(2), (4) Date: Dec. 7, 2011

(87) PCT Pub. No.: WO2010/143855
PCT Pub. Date: Dec. 16, 2010

(65) Prior Publication Data
US 2012/0151327 A1 Jun. 14, 2012

Related U.S. Application Data

(60) Provisional application No. 61/184,947, filed on Jun. 8, 2009.

(51) Int. Cl.
*G06F 17/00* (2006.01)
*H04N 21/6587* (2011.01)
(Continued)

(52) U.S. Cl.
CPC .......... *H04N 21/6587* (2013.01); *G06F 9/4445* (2013.01); *G06F 17/30905* (2013.01);
(Continued)

(58) Field of Classification Search
CPC ............................. G06F 17/30905; G06F 8/38
USPC ......................... 715/200, 201, 203, 234, 238
See application file for complete search history.

(56) References Cited

U.S. PATENT DOCUMENTS 7,774,425 B2 * 8/2010 Jin .................... G06F 17/30864
709/217
8,131,276 B2 * 3/2012 Lee .................... G06F 17/30905
455/3.06
(Continued)

FOREIGN PATENT DOCUMENTS

CN 1538321 10/2004
CN 101106498 1/2008
(Continued)

OTHER PUBLICATIONS

International Search Report for PCT/KR2010/003647, mailed Feb. 23, 2011.
(Continued)

*Primary Examiner* — Stephen Hong
*Assistant Examiner* — Gregory J Vaughn
(74) *Attorney, Agent, or Firm* — Staas & Halsey LLP (57) ABSTRACT

A method of providing a remote user interface (RUI) includes receiving a RUI request including first preference format information, second preference format information, and transmission option information, the first preference format information being related to a format preferred by a client device with respect to the RUI, the second preference format information being related to a format preferred by the client device with respect to a video included in the RUI, and the transmission option information indicating whether to consider the second preference format information when transmission of the RUI is decided; comparing a format of the RUI with only the first preference format information, or comparing the format of the RUI and the format of the video comprised in the RUI with the first preference format information and the second preference format information, respectively, based on the transmission option information; and selectively transmitting the RUI to the client.

13 Claims, 6 Drawing Sheets

(51) Int. Cl.
   *G06F 17/30*   (2006.01)
   *H04L 12/00*   (2006.01)
   *H04L 12/28*   (2006.01)
   *H04N 21/236*  (2011.01)
   *H04N 21/47*   (2011.01)
   *H04N 21/81*   (2011.01)
   *G06F 9/44*    (2006.01)
   *H04L 29/06*   (2006.01)
   *H04L 29/08*   (2006.01)

(52) U.S. Cl.
   CPC .............. *H04L12/00* (2013.01); *H04L 12/281* (2013.01); *H04L 65/00* (2013.01); *H04L 67/02* (2013.01); *H04N 21/23614* (2013.01); *H04N 21/47* (2013.01); *H04N 21/8173* (2013.01)

(56) References Cited

U.S. PATENT DOCUMENTS

| | | | | |
|---|---|---|---|---|
| 8,244,179 B2 * | 8/2012 | Dua | ............ | G06F 17/30058 340/10.51 |
| 8,271,675 B2 * | 9/2012 | Oh | ............ | G06F 3/0482 709/203 |
| 8,539,039 B2 * | 9/2013 | Sheu | ............ | G06F 9/4445 709/202 |
| 8,893,108 B1 * | 11/2014 | Pfeiffer | ............ | G06F 8/65 705/31 |
| 2004/0207721 A1 * | 10/2004 | Yoon | ............ | G06F 9/4443 348/14.02 |
| 2006/0258289 A1 * | 11/2006 | Dua | ............ | G06F 17/30058 455/41.3 |
| 2007/0005783 A1 * | 1/2007 | Saint-Hillaire | ..... | H04L 12/2803 709/230 |
| 2007/0078987 A1 * | 4/2007 | Walker | ............ | H04L 12/282 709/227 |
| 2007/0192441 A1 * | 8/2007 | Jin | ............ | H04L 67/18 709/219 |
| 2008/0016177 A1 * | 1/2008 | Jin | ............ | G06F 17/30864 709/217 |

FOREIGN PATENT DOCUMENTS

| | | |
|---|---|---|
| JP | 2004-266576 | 9/2004 |
| JP | 2009-003636 | 1/2009 |
| JP | 2010-524056 | 7/2010 |
| KR | 10-0513278 | 9/2005 |
| KR | 10-0772861 | 11/2007 |

OTHER PUBLICATIONS

Extended European Search Report mailed Feb. 6, 2013 for corresponding European Application No. 10786338.3.
Chinese Office Action issued Dec. 4, 2013 in corresponding Chinese Patent Application No. 201080034898.4.
European Examination Report issued Mar. 3, 2014 in corresponding European Application No. 10786338.3.
Chinese Office Action issued Jul. 3, 2014 in corresponding Chinese Application No. 201080034898.4.
Japanese Notice of Allowance issued Jul. 1, 2014 in corresponding Japanese Application No. 2012-514880.

* cited by examiner

```
<protocol shortName="CE-HTML-1.0">
    <uri>http://1.8.7.2:333/DVDUI</uri>
    <protocolInfo>
        <relatedData xmlns="urn:schemas-ce-org:ce-html-server-caps-1-0">
            <profilelist>
                <ui_profile name="SD_UIPROF"/>
                <video_profile name="MPEG_PS_PAL" type="video/mpeg"/>
            </profilelist>
        </relatedData>
    </protocolInfo>
</protocol>
```

FIG. 3

```
GET /RUIAppPath HTTP/1.1
HOST: hostname:hostport<ui_profile name="SD_UIPROF"><ext><AVCapabilityMode>
User-Agent: CE-HTML/1.0 (<profilelist>
Relax</AVCapabilityMode></ext></ui_profile></profilelsit>
```

FIG. 4

```
GET /RUIAppPath HTTP/1.1
HOST: hostname:hostport
User-Agent: CE-HTML/1.0 (<profilelist><ui_profile name="SD_UIPROF">
<ext><AVControlUI> No</AVControlUI ></ext></ui_profile></profilelsit>
```

FIG. 5

Hyper Link : <a href="URL" title="link title" target="link target" class="link class">link label</a>
MIME-types: application/ce-html+xml, application/x-ce-html+xml, image/jpeg, image/png or image/gif (<profilelist><ui_profile name="SD_UIPROF"><ext><pointer> true</ pointer></ext></ui_profile><video_profile name="MPEG_PS_NTSC" type="video/mpeg"/></profilelsit>)

FIG. 6

```
<object type="video/mpeg" id="vid1" data="http://www.avsource.com/video/test.mpg">
    <param name="dlna_res_attr"
    value="protocolInfo="http-get:*:video/mpeg:
    DLNA.ORG_PN=MPEG_PS_NTSC"duration="1:25:34""/>
    <param name=" aspectratio " value=" 1.33" />
</object>
    vid1.play(1)
      vid1.CloseCaption(1)
      vid1.CloseCaption(0)
```

```
<?xml version="1.0"?>
<e:propertyset xmlns="urn:schemas-upnp-org:device-1-0"
      xmlns:e="urn:schemas-upnp-org:event-1-0">
<e:property>
   <ruiEventURL>New Notification URL<ruiEventURL>
   <ruiEventURL>New Notification URL<ruiEventURL>
</e:property>
<e:property>
   <friendlyName>Friendly Name for the event<friendlyName>
</e:property>
<e:property>
<profilelist><ui_profile name="SD_UIPROF"/><profilelist>
   <profilelist><ui_profile name="HD_UIPROF"/><profilelist>
</e:property>
</e:propertyset>
```

METHOD AND APPARATUS FOR PROVIDING A REMOTE USER INTERFACE

CROSS-REFERENCE TO RELATED APPLICATIONS

This application is a U.S. national phase of International Application No. PCT/KR2010/003647 filed on Jun. 8, 2010, which claims priority to U.S. Provisional Application No. 61/184,947, filed on Jun. 8, 2009, the contents of which are hereby incorporated by reference.

BACKGROUND

1. Field

The present disclosure relates to a method and apparatus for providing a remote user interface (RUI), which is with respect to a service provided by a server, to a client device.

2. Description of the Related Art

Due to the spread of home networks, a house network environment expands from a personal computer (PC)-based environment to an environment including home appliances that use various sub-network technologies. Thus, there is a necessity for a technology capable of networking the home appliances in a unified manner by using an Internet protocol (IP), and so, a home network middleware standard such as a digital living network alliance (DLNA) is proposed.

In the DLNA, a home network environment is formed by using a remote user interface (RUI), and a DLNA-based home network is configured of a RUI client device, a RUI server, and the like. Examples of a home network technology using a RUI according to the related art include eXpandable Home Theater (XHT), CEA201.4, eXtended Remoting Technology (XRT), and the like.

SUMMARY

The present disclosure provides a method and apparatus for providing a remote user interface (RUI), which is with respect to a service provided by a server, to a client device.

Additional aspects and/or advantages will be set forth in part in the description which follows and, in part, will be apparent from the description, or may be learned by practice of the disclosure.

According to an aspect of the present disclosure, there is provided a method of providing a remote user interface (RUI) with respect to a service provided by a server to a client device, the method including operations of receiving a RUI request including first preference format information, second preference format information, and transmission option information, wherein the first preference format information is related to a format preferred by the client device with respect to the RUI, the second preference format information is related to a format preferred by the client device with respect to a video included in the RUI, and the transmission option information indicates whether to consider the second preference format information when transmission of the RUI is decided; comparing a format of the RUI with only the first preference format information, or comparing the format of the RUI and the format of the video included in the RUI with the first preference format information and the second preference format information, respectively, based on the transmission option information; and selectively transmitting the RUI to the client device based on a result of the operation of comparing.

According to one or more embodiments of the present disclosure, when a client device transmits a remote user interface (RUI) request to a server, the RUI request includes transmission option information, and a user sets the transmission option information so as not to consider a second preference format, so that, although a format of a video included in a RUI does not match with second preference format information indicating a format preferred by the client device with respect to the video included in the RUI, the user may still receive the RUI.

According to an aspect of the present disclosure, there is provided a method of providing a remote user interface (RUI) with respect to a service provided by a server to a client device, the method including operations of receiving a RUI request including first preference format information, second preference format information, and transmission option information, wherein the first preference format information is related to a format preferred by the client device with respect to the RUI, the second preference format information is related to a format preferred by the client device with respect to a video included in the RUI, and the transmission option information indicates whether to consider the second preference format information when transmission of the RUI is decided; comparing a format of the RUI with only the first preference format information, or comparing the format of the RUI and the format of the video included in the RUI with the first preference format information and the second preference format information, respectively, based on the transmission option information; and selectively transmitting the RUI to the client device based on a result of the operation of comparing.

The method may further include an operation of transmitting information regarding a service to be provided by the server and a uniform resource locator (URL) to connect the service to the client device, wherein the RUI request is transmitted from the client device to the server via the URL.

The RUI request may further include control UI option information for requesting transmission of the RUI in which a user interface for controlling reproduction of the video included in the RUI is removed.

The operation of transmitting the RUI may include an operation of transmitting a hyper text markup language (HTML) document indicating the RUI to the client device, and the HTML document may further include link information including format information regarding another RUI corresponding to a URL in the form of a link included in the HTML document, and format information regarding a video included in the other RUI.

The operation of transmitting the RUI may include an operation of transmitting a hyper text markup language (HTML) document indicating the RUI to the client device, and the HTML document may further include subtitle display information indicating whether to display subtitles with respect to the video included in the RUI.

If the operation of comparing includes an operation of only comparing the format of the RUI with the first preference format information, the operation of transmitting the RUI may include an operation of transmitting the RUI to the client device when the format of the RUI matches the first preference format information, and if the operation of comparing includes an operation of comparing the format of the RUI and the format of the video included in the RUI with the first preference format information and the second preference format information, respectively, the operation of transmitting the RUI may include an operation of transmitting the RUI to the client device when the format of the RUI matches the first preference format information, and the format of the video included in the RUI matches the second preference format information.

According to another aspect of the present disclosure, there is provided a method of providing a remote user interface (RUI), the method including operations of transmitting UI profile information to a client device, wherein the UI profile information includes a plurality of uniform resource locators (URLs) for providing a plurality of RUIs having different formats with respect to a service provided by a server, and information regarding a format type of each of the plurality of RUIs with respect to the service; receiving a RUI request from the client device, wherein the RUI request includes a request for transmission of one of the plurality of RUIs based on one of the plurality of URLs; and transmitting a RUI from among the plurality of RUIs which corresponds to the RUI request to the client device.

According to another aspect of the present disclosure, there is provided a remote user interface (RUI) providing apparatus for providing a RUI with respect to a service provided by a server to a client device, the RUI providing apparatus including a receiving unit to receive a RUI request including first preference format information, second preference format information, and transmission option information, wherein the first preference format information is related to a format preferred by the client device with respect to the RUI, the second preference format information is related to a format preferred by the client device with respect to a video included in the RUI, and the transmission option information indicates whether to consider the second preference format information when transmission of the RUI is decided; a comparing unit to compare a format of the RUI with only the first preference format information, or comparing the format of the RUI and the format of the video included in the RUI with the first preference format information and the second preference format information, respectively, based on the transmission option information; and a transmitting unit to selectively transmit the RUI to the client device, according to a result of the comparing.

According to another aspect of the present disclosure, there is provided a remote user interface (RUI) providing apparatus including a transmitting unit to transmit UI profile information to a client device, wherein the UI profile information includes a plurality of uniform resource locators (URLs) for providing a plurality of RUIs having different formats with respect to a service provided by a server, and information regarding a format type of each of the plurality of RUIs with respect to the service; and a receiving unit to receive a RUI request from the client device, wherein the RUI request includes a request for transmission of one of the plurality of RUIs based on one of the plurality of URLs, wherein the transmitting unit transmits a RUI from among the plurality of RUIs which corresponds to the RUI request to the client device.

According to another aspect of the present disclosure, there is provided a non-transitory computer-readable recording medium having recorded thereon a program for executing a method of providing a remote user interface (RUI), the method including operations of receiving a RUI request including first preference format information, second preference format information, and transmission option information, wherein the first preference format information is related to a format preferred by the client device with respect to the RUI, the second preference format information is related to a format preferred by the client device with respect to a video included in the RUI, and the transmission option information indicates whether to consider the second preference format information when transmission of the RUI is decided; comparing a format of the RUI with only the first preference format information, or comparing the format of the RUI and the format of the video included in the RUI with the first preference format information and the second preference format information, respectively, based on the transmission option information; and according to a result of the operation of comparing, selectively transmitting the RUI to the client device.

According to another aspect of the present disclosure, there is provided a non-transitory computer-readable recording medium having recorded thereon a program for executing a method of providing a remote user interface (RUI), the method including operations of transmitting UI profile information to a client device, wherein the UI profile information includes a plurality of uniform resource locators (URLs) for providing a plurality of RUIs having different formats with respect to a service provided by a server, and information regarding a format type of each of the plurality of RUIs with respect to the service; receiving a RUI request from the client device, wherein the RUI request includes a request for transmission of one of the plurality of RUIs based on one of the plurality of URLs; and transmitting a RUI from among the plurality of RUIs which corresponds to the RUI request to the client device.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Hereinafter, the present disclosure will be described in detail by explaining exemplary embodiments of the disclosure with reference to the attached drawings.

Figure 1:
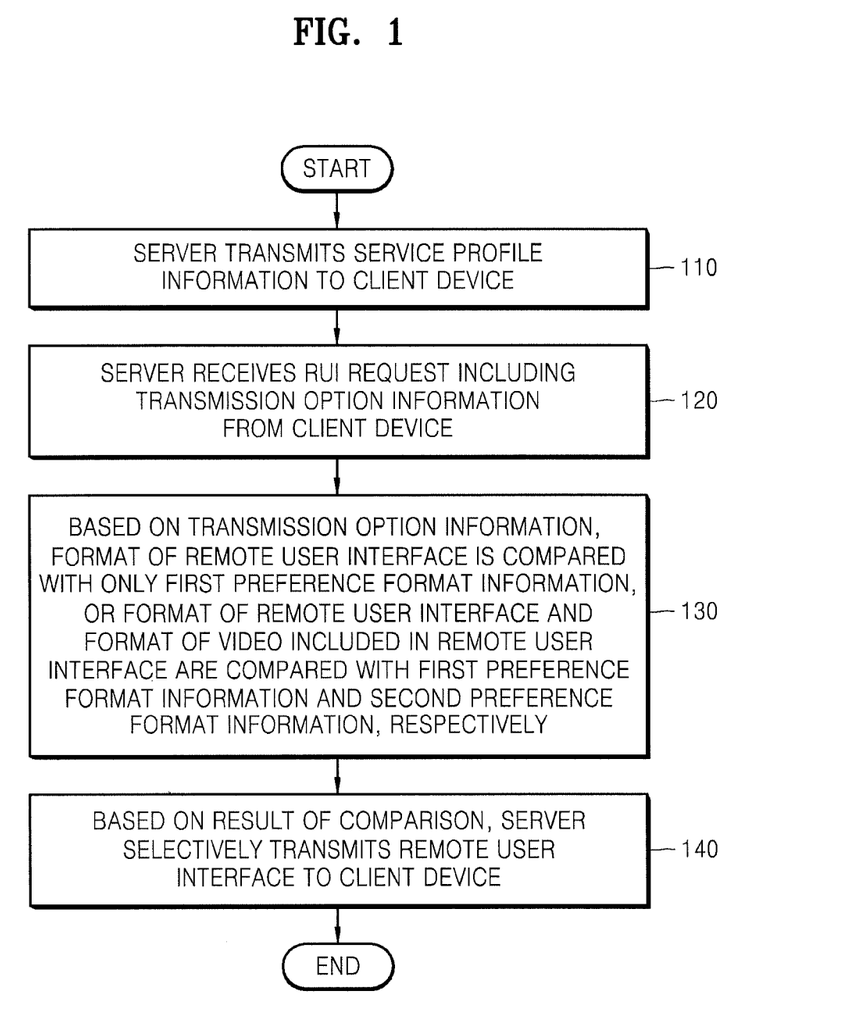
FIG. 1 is a flowchart describing a method of providing a remote user interface (RUI) according to an embodiment of the present disclosure.

FIG. 1 is a flowchart describing a method of providing a remote user interface (RUI) according to an embodiment of the present disclosure. Hereinafter, it is assumed that operations to be described below are performed in a home network configured of a server and a client device. Here, the home network according to the present embodiment may be a digital living network alliance (DLNA)-based home network.

In operation 110, service profile information including information regarding a service provided by the server, and a uniform resource locator (URL) to connect the service is transmitted to the client device.

Here, the service provided by the server may include a plurality of services, and if so, the service profile information may include information regarding the plurality of services, and a plurality of URLs corresponding to the plurality of services, respectively.

For example, when power is applied to the server, the server may transmit the service profile information to the client device included in the home network, and when power is applied to the client device, the client device may search for the server in the home network and may receive the service profile information from the server.

Figure 2:
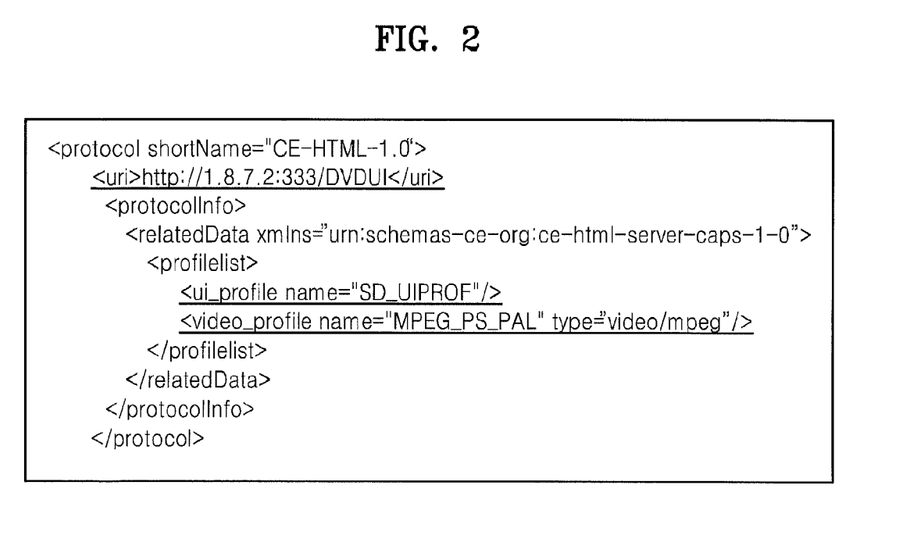
FIG. 2 illustrates service profile information according to an embodiment of the present disclosure.

An example of the service profile information will be provided with reference to FIG. 2.

However, in another embodiment, operation 110 may be omitted. For example, if the client device already knows a URL of the server or has a database (DB) containing the URL of the server separately stored therein, it is not necessary to perform operation 110.

In operation 120, the server receives a RUI request including first preference format information, second preference format information, and transmission option information, wherein the first preference format information is related to a format preferred by the client device with respect to a RUI related to the service provided by the server, the second preference format information is related to a format preferred by the client device with respect to a video included in the RUI, and the transmission option information indicates whether to consider the second preference format information when transmission of the RUI is decided.

The RUI request is a command by which the client device requests the server for transmission of the RUI, and in this regard, when the client device connects the server via the URL received from the server in operation 110, the client device transmits the RUI request to the server. In another embodiment, the client device may connect a server via a URL of the server which has been already given to the client device or via a URL of the server which is read from the DB of the client device.

The transmission option information indicates whether to consider the second preference format information regarding the format that is preferred by the client device with respect to the video included in the RUI, when the server determines whether to transmit the RUI to the client device in response to the RUI request from the client device.

Figure 3:
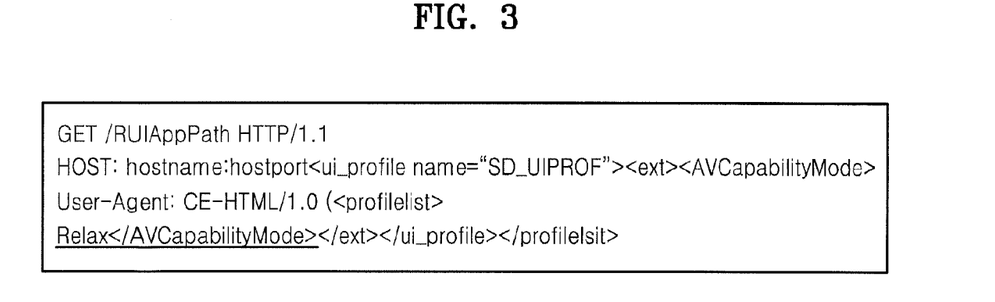
FIG. 3 illustrates transmission option information of an RUI request according to an embodiment of the present disclosure.

An example of the transmission option information will be provided with reference to FIG. 3.

In the present embodiment, a first preference format indicates a format preferred by the client device with respect to the RUI, and may have a standard definition (SD) or a high definition (HD). Also, a second preference format indicates a format preferred by the client device with respect to the video included in the RUI, and may include a Moving Picture Experts Group (MPEG) video format having extensions of mpeg, mpg, and mpe or a QuickTime video format having extensions of qt and mov.

In another embodiment, the RUI request may further include control UI option information for requesting transmission of the RUI in which a user interface for controlling reproduction of the video included in the RUI is removed.

For example, in a case where the client device has a local user interface for controlling video reproduction such as reproduction, stop, volume adjustment, and the like related to a video, if the client device receives the user interface for controlling the reproduction of the video from the server, the local user interface of the client device may collide with the user interface for controlling the reproduction of the video from the server, and so, the client device transmits the RUI request, which includes the control UI option information for requesting transmission of the RUI in which the user interface for controlling the reproduction of the video is removed, to the server. By doing so, the client device may receive the RUI in which the user interface for controlling the reproduction of the video is removed from the server.

Figure 4:
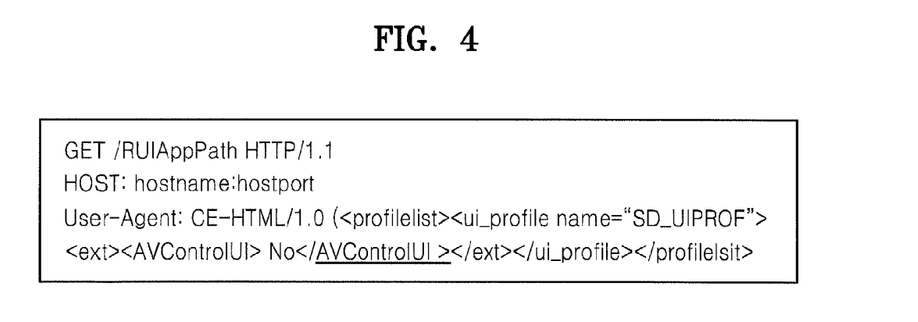
FIG. 4 illustrates control UI option information of an RUI request according to an embodiment of the present disclosure.

An example of the control UI option information will be provided with reference to FIG. 4.

In operation 130, based on the transmission option information, a format of the RUI is compared with only the first preference format information, or the format of the RUI and the format of the video included in the RUI are compared with the first preference format information and the second preference format information, respectively.

For example, if the transmission option information is set to consider the second preference format, the server compares whether the format of the RUI matches with the first preference format information, and whether the format of the video included in the RUI matches with the second preference format information. However, if the transmission option information is set not to consider the second preference format, the server may only compare whether the format of the RUI matches with the first preference format information.

In operation 140, based on a result of the comparison, the server selectively transmits the RUI to the client device.

In more detail, in a case where only the format of the RUI is compared with the first preference format information in operation 130, if the format of the RUI matches with the first preference format information, the RUI is transmitted to the client device, and if the format of the RUI does not match with the first preference format information, the RUI is not transmitted to the client device.

Also, in a case where the format of the RUI is compared with the first preference format information, and the format of the video included in the RUI is compared with the second preference format information in operation 130, if the format of the RUI matches with the first preference format information, and the format of the video included in the RUI matches with the second preference format information, the RUI is transmitted to the client device, and if the format of the RUI does not match with the first preference format information or the format of the video included in the RUI does not match with the second preference format information, the RUI is not transmitted to the client device.

In the present embodiment, the server may transmit the RUI to the client device by transmitting a hyper text markup language (HTML) document indicating the RUI to the client device.

Here, the HTML document may further include link information including information regarding the format of the RUI corresponding to a URL in the form of a link included in the HTML document, and information regarding the format of the video included in the RUI corresponding to the URL.

Figure 5:
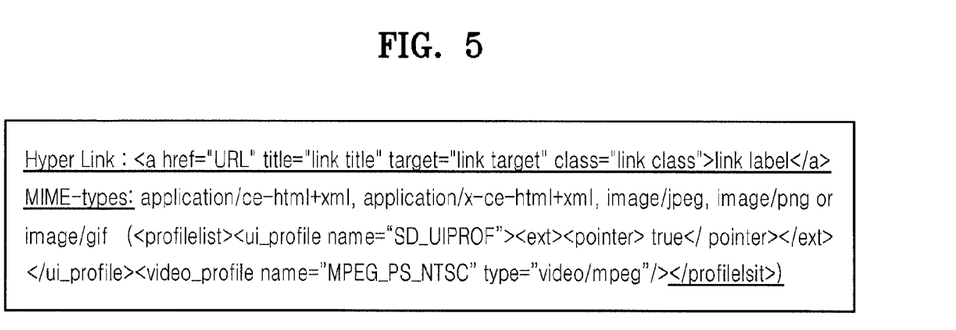
FIG. 5 illustrates link information of a hyper text markup language (HTML) document indicating an RUI according to an embodiment of the present disclosure.

An example of the link information will be provided with reference to FIG. 5.

In another embodiment, the HTML document indicating the RUI may further include subtitle display information indicating whether to display subtitles with respect to the video included in the RUI.

Figure 6:
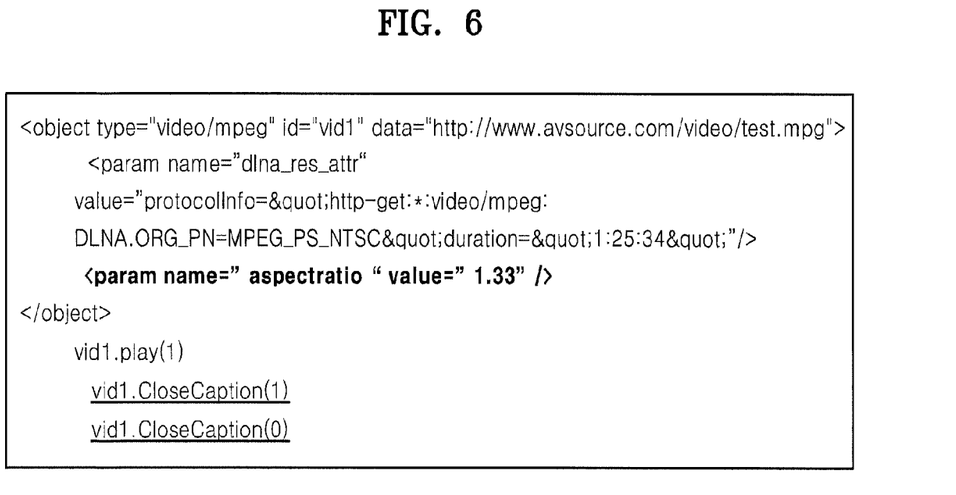
FIG. 6 illustrates subtitle display information according to an embodiment of the present disclosure.

An example of the subtitle display information will be provided with reference to FIG. 6.

According to the related art, if the format of the video included in the RUI does not match with the second preference format information, the server notifies the client device of an error and does not transmit the RUI to the client device. By doing so, if a user wants to receive the RUI even though the video included in the RUI is not reproducible, the user does not receive the RUI because the format of the video included in the RUI does not match with the second preference format information preferred by the user.

However, according to the present embodiment, when the client device transmits the RUI request to the server, the RUI request includes the transmission option information, and the user sets the transmission option information so as not to consider the second preference format, so that, although the format of the video included in the RUI does not match with the second preference format information indicating the format preferred by the client device with respect to the video included in the RUI, the user may still receive the RUI.

FIG. 2 illustrates service profile information according to an embodiment of the present disclosure.

Referring to FIG. 2, <uri>http://1.8.7.2:333/DVDUI> indicates that a URL to connect a digital versatile disc (DVD) reproducing service provided by a server is 1.8.7.2:333.

<ui_profile name="SD_UIPROF"/> indicates that a format of a RUI with respect to the DVD reproducing service is SD.

<video_profile name="MPEG_PS_PAL" type="video/mpeg"/> indicates that a format of a video included in the RUI with respect to the DVD reproducing service is MPEG_PS_PAL.

FIG. 3 illustrates transmission option information of an RUI request according to an embodiment of the present disclosure.

In FIG. 3, the RUI request is displayed in the form of an HTML language.

Referring to FIG. 3, <ui_profile name="SD_UIPROF"> indicates that a first preference format preferred by a client device with respect to a RUI is SD.

<ext> indicates that additional information may be further included. For example, instead of <ext>, <video_profile name="MPEG_PS_PAL" type="video/mpeg"/> may be included and indicates a second preference format preferred by the client device with respect to a video included in the RUI. Here, name="MPEG_PS_PAL" indicates that a name of the second preference format defined in a DLNA is "MPEG_PS_PAL", and type="video/mpeg" indicates that a type of the second preference format is an MPEG video format. In another embodiment, instead of <ext>, information regarding not only a video format but also information regarding an audio format may be further included.

<AVCapabilityMode>Relax</AVCapabilityMode> indicates the transmission option information. If <AVCapabilityMode> is set as 'Relax', the second preference format preferred by the client device with respect to the video included in the RUI is not considered when a server decides whether to transmit the RUI to the client device.

If <AVCapabilityMode> is not included in the RUI request or if <AVCapabilityMode> is set as 'default', the second preference format preferred by the client device with respect to the video included in the RUI is considered when the server decides whether to transmit the RUI to the client device.

In the embodiment of FIG. 3, the transmission option information is displayed as <AVCapabilityMode> but a form of the transmission option information is not limited thereto.

For example, the transmission option information may be displayed as <video_profile name="MPEG_PS_PAL" type="*"/>. Here, name="MPEG_PS_PAL" indicates that the name of the second preference format defined in the DLNA is "MPEG_PS_PAL", and type="*" indicates that the second preference format preferred by the client device with respect to the video included in the RUI is not considered when the server decides whether to transmit the RUI to the client device. That is, type="*" indicates a request of the RUI regardless of a type of the video format.

FIG. 4 illustrates control UI option information of an RUI request according to an embodiment of the present disclosure.

In FIG. 4, the RUI request is displayed in the form of HTML. Referring to FIG. 4, <AVControlUI>No</AVControlUI> indicates the control UI option information and means a transmission request for an RUI in which a user interface for controlling reproduction of a video is removed.

FIG. 5 illustrates link information of an HTML document indicating an RUI according to an embodiment of the present disclosure.

In FIG. 5, the link information to be added to the HTML document indicating the RUI is displayed in the form of HTML.

Referring to FIG. 5, Hyper Link: <a href="URL" title="link title" target="link target" class="link class">link label</a>, href="URL" indicates a URL linked in the HTML document indicating the RUI, title="link title" indicates a title of the linked URL, and target="link target" indicates a name of a window to which another RUI corresponding to the linked URL is output.

MIME-types: indicates that following sentences indicate a format of the URL linked to the RUI.

<ui_profile name="SD_UIPROF"> indicates that a format of the other RUI corresponding to the linked URL is SD.

<video_profile name="MPEG_PS_NTSC" type="video/mpeg"/> indicates that a name of a video format of a video included in the other RUI corresponding to the linked URL is "MPEG_PS_PAL", and a type of the video format is an MPEG video format.

FIG. 6 illustrates subtitle display information according to an embodiment of the present disclosure.

In FIG. 6, the subtitle display information to be added to an HTML document indicating a RUI is displayed in the form of HTML.

Referring to FIG. 6, vid1.CloseCaption indicates the subtitle display information, and in this regard, vid1.CloseCaption(1) indicates that subtitles with respect to a video included in the RUI are displayed, and vid1.CloseCaption(0) indicates that the subtitles with respect to the video included in the RUI are not displayed.

In another embodiment, a plurality of RUIs having different formats may be provided for a service that is provided by a server. Hereinafter, this embodiment will be described.

Figure 7:
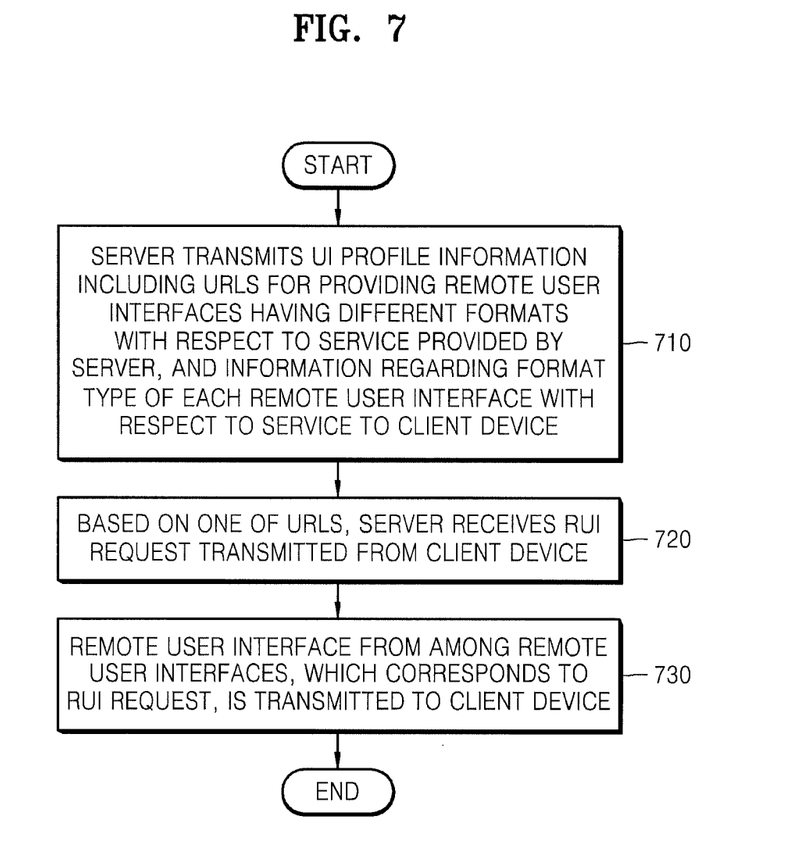
FIG. 7 is a flowchart describing a method of providing a RUI according to another embodiment of the present disclosure.

FIG. 7 is a flowchart describing a method of providing a RUI according to another embodiment of the present disclosure.

In operation 710, UI profile information is transmitted to a client device, and includes a plurality of URLs for providing the plurality of RUIs having different formats with respect to the service provided by the server, and information regarding a format type of each of the plurality of RUIs with respect to the service.

Here, the UI profile information is not the same kind of information as the service profile information of FIG. 1 which is transmitted from the server to the client device when power is newly applied to the server and the client device, but the UI profile information is transmitted from the server to the client device whenever the server provides the plurality of RUIs having different formats with respect to the service provided by the server.

Thus, after the service profile information of FIG. 1 is transmitted to the client device, if the server attempts to provide the client device with a plurality of RUIs having different formats with respect to a specific service, the server may provide the client device with a plurality of URLs for providing the plurality of RUIs.

Figure 8:
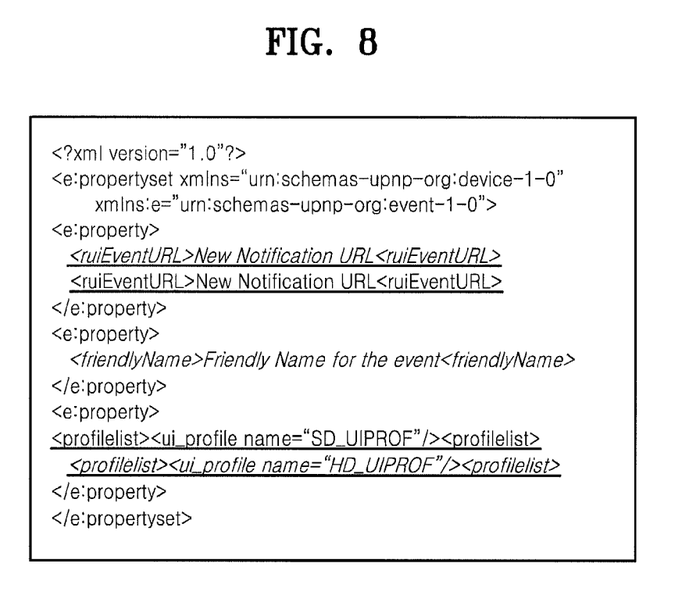
FIG. 8 illustrates UI profile information according to an embodiment of the present disclosure.

An example of the UI profile information will be provided with reference to FIG. 8.

In operation 720, the server receives a RUI request from the client device, wherein the RUI request includes a request for transmission of one of the plurality of RUIs based on one of the plurality of URLs.

For example, in a case where the client device receives a first URL for a RUI having a SD format and a second URL for a RUI having a HD format from the server, the client device may connect the first URL and may transmit a RUI request to the server so as to request transmission of the RUI having a SD format.

In operation 730, a RUI from among the plurality of RUIs, which corresponds to the RUI request, is transmitted to the client device.

For example, if the client device has transmitted the RUI request to the server so as to request transmission of the RUI having a SD format, the client device receives the RUI having a SD format.

In the present embodiment, the server provides one service. However, if the server provides a plurality of services, a plurality of URLs for each type of the RUIs with respect to the plurality of services may be provided to the client device.

For example, if the server provides an A service and a B service, the server may provide the client device with a URL for providing a RUI having a SD format with respect to the A service, a URL for providing a RUI having a HD format with respect to the A service, a URL for providing a RUI having a SD format with respect to the B service, and a URL for providing a RUI having a HD format with respect to the B service.

FIG. 8 illustrates UI profile information according to an embodiment of the present disclosure.

In FIG. 8, the UI profile information is displayed in the form of an extensible markup language (XML) document.

Referring to FIG. 8, <ruiEventURL>New Notification URL<ruiEventURL> indicates that a server has a URL to be newly notified so as to provide a RUI to a client device. Here, New Notification URL indicates the URL for providing the RUI, and for example, the URL is displayed as 1.3.4.5.:5910.

Also, in FIG. 8, <ruiEventURL>New Notification URL<ruiEventURL> is displayed twice, and this means that the client device is notified about two URLs with respect to one service. If the server provides three RUIs having 3 different formats, <ruiEventURL>New Notification URL<ruiEventURL> is displayed three times.

<profilelist><ui_profile name="SD_UIPROF"/><profilelist> indicates that a first URL provides a RUI having a SD format.

<profilelist><ui_profile name="HD_UIPROF"/><profilelist> indicates that a second URL provides a RUI having a HD format.

According to the related art, with respect to one service, a server provides only one RUI having a predefined format to a client device. However, according to the one or more embodiments of the present disclosure, with respect to one service, the server may provide the client device with a plurality of RUIs having a plurality of formats for a format type of each RUI. Also, the client device may connect a URL that is from among a plurality of URLs with respect to the plurality of RUIs provided by the server and that provides a RUI having a client-desired format based on UI profile information, and the client device may then receive a desired RUI.

Descriptions regarding a plurality of pieces of information illustrated in FIGS. 2-6, and 8 are explained in detail in the American National Standards Institute (ANSI) standard document CEA-2014-B web-based protocol and framework for RUI on UPnP networks and the Internet, and thus detailed descriptions other than the aforementioned descriptions regarding the plurality of pieces of information are omitted.

Figure 9:
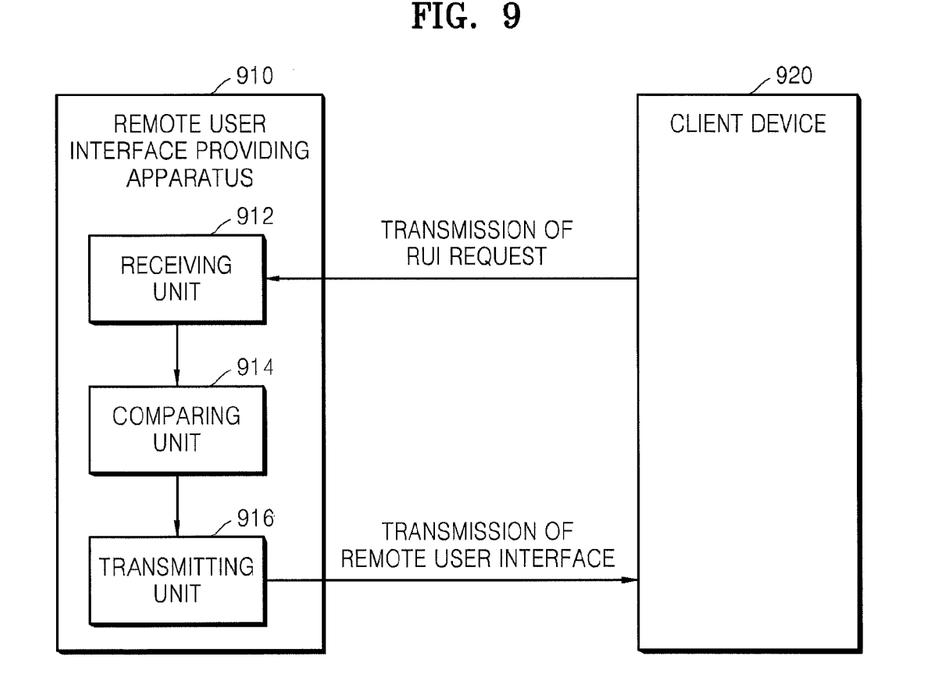
FIG. 9 illustrates a RUI providing apparatus, according to an embodiment of the present disclosure.

FIG. 9 illustrates a RUI providing apparatus 910, according to an embodiment of the present disclosure.

Referring to FIG. 9, the RUI providing apparatus 910 includes a receiving unit 912, a comparing unit 914, and a transmitting unit 916. Here, it is assumed that the RUI providing apparatus 910 is embedded in a server. For convenience of description, a client device 920 is further illustrated.

The receiving unit 912 receives a RUI request including first preference format information, second preference format information, and transmission option information, wherein the first preference format information is related to a format preferred by the client device 920 with respect to a RUI, the second preference format information is related to a format preferred by the client device 920 with respect to a video included in the RUI, and the transmission option information indicates whether to consider the second preference format information when transmission of the RUI is decided.

The comparing unit 914 compares a format of the RUI with only the first preference format information, or compares the format of the RUI and the format of the video included in the RUI with the first preference format information and the second preference format information, respectively, based on the transmission option information.

According to a result of the comparison, the transmitting unit 916 selectively transmits the RUI to the client device 920.

Figure 10:
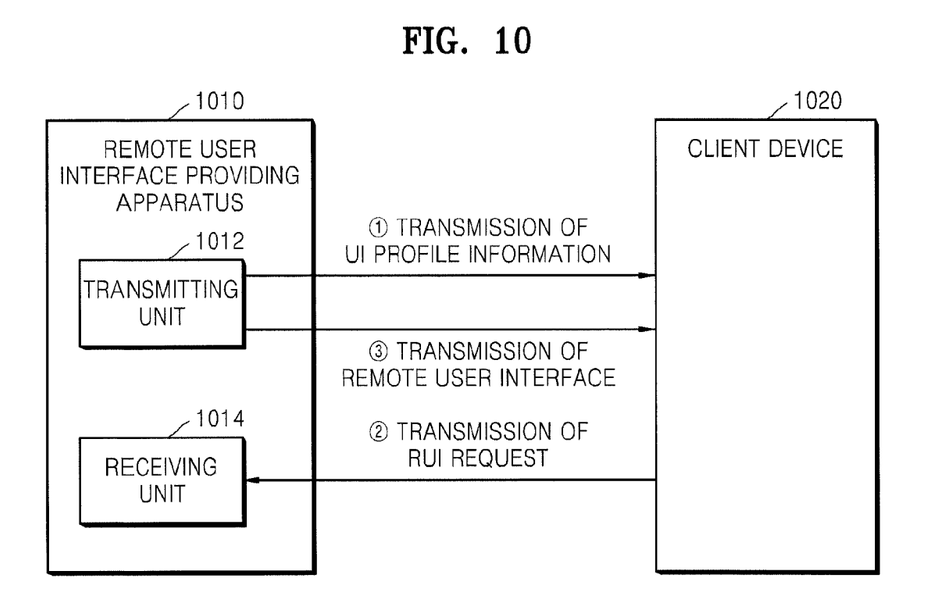
FIG. 10 illustrates a RUI providing apparatus, according to another embodiment of the present disclosure.

FIG. 10 illustrates a RUI providing apparatus 1010, according to another embodiment of the present disclosure.

Referring to FIG. 10, the RUI providing apparatus 1010 includes a transmitting unit 1012 and a receiving unit 1014. Here, it is assumed that the RUI providing apparatus 1010 is embedded in a server. For convenience of description, a client device 1020 is further illustrated.

The transmitting unit 1012 transmits UI profile information to the client device 1020, wherein the UI profile information includes a plurality of URLs for providing a plurality of RUIs having different formats with respect to a service provided by the server, and information regarding a format type of each of the plurality of RUIs with respect to the service.

The receiving unit 1014 receives a RUI request from the client device 1020, wherein the RUI request includes a request for transmission of one of the plurality of RUIs based on one of the plurality of URLs.

The transmitting unit 1012 transmits a RUI from among the plurality of RUIs, which corresponds to the RUI request, to the client device 1020.

The embodiments of the present disclosure may be written as computer programs and can be implemented in general-use digital computers that execute the programs using a computer readable recording medium. In addition, a data structure used in the embodiments of the present disclosure may be written in a non-transitory computer readable recording medium in various ways. Examples of the computer readable recording medium include magnetic storage media (e.g., ROM, floppy disks, hard disks, etc.), optical recording media (e.g., CD-ROMs, or DVDs), etc.

While the present disclosure has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of providing a remote user interface (RUI) by a server to a client device, the method comprising:
    receiving a RUI request comprising first preference format information indicating a RUI format associated with the client device, second preference format information indicating a video format associated with the client device, and transmission option information indicating whether to consider the second preference format information if transmission of a RUI for the client device is identified;
    if the transmission option information is 0, comparing a format of the RUI for the client device with the first preference format information;
    if the transmission option information is 1, comparing a format of the RUI for the client device and a format of the video with the first preference format information and the second preference format information; and
    transmitting the RUI to the client device based on a result of the comparing.

2. The method of claim 1, further comprising transmitting information regarding a service to be provided by the server and a uniform resource locator (URL) to connect the service to the client device,
    wherein the RUI request is transmitted from the client device to the server via the URL.

3. The method of claim 1, wherein the RUI request further comprises control UI option information for requesting transmission of the RUI in which a user interface for controlling reproduction of the video is removed.

4. The method of claim 1, wherein the transmitting of the RUI comprises transmitting a hyper text markup language (HTML) document indicating the RUI to the client device, and
    the HTML document further comprises link information comprising format information regarding another RUI corresponding to a URL in the form of a link comprised in the HTML document, and format information regarding a video comprised in the another RUI.

5. The method of claim 1, wherein the transmitting of the RUI comprises transmitting a hyper text markup language (HTML) document indicating the RUI to the client device, and
    the HTML document further comprises subtitle display information indicating whether to display subtitles with respect to the video.

6. The method of claim 1, wherein the comparing a format of the RUI for the client device with the first preference format information comprises comparing the format of the RUI with only the first preference format information, the transmitting of the RUI comprises transmitting the RUI to the client device when the format of the RUI matches with the first preference format information, and
    wherein the comparing a format of the RUI for the client device and a format of the video with the first preference format information and the second preference format information comprises comparing the format of the RUI and the format of the video with the first preference format information and the second preference format information, respectively, the transmitting of the RUI comprises transmitting the RUI to the client device when the format of the RUI matches with the first preference format information, and the format of the video matches with the second preference format information.

7. A non-transitory computer-readable recording medium having recorded thereon a program for executing the method of claim 1.

8. A remote user interface (RUI) providing apparatus for providing a RUI by a server to a client device, the RUI providing apparatus comprising:
    a receiving unit to receive a RUI request comprising first preference format information indicating a RUI format associated with the client device, second preference format information indicating a video format associated with the client device, and transmission option information indicating whether to consider the second preference format if transmission of a RUI for the client device is identified;
    a comparing unit to compare a format of the RUI with the first preference format information if the transmission option information is 0, and to compare a format of the RUI for the client device and a format of the video with the first preference format information and the second preference format information if the transmission option information is 1; and
    a transmitting unit to transmit the RUI to the client device, according to a result of the comparing.

9. The RUI providing apparatus of claim 8, wherein the transmitting unit further transmits information regarding a service to be provided by the server and a uniform resource locator (URL) to connect the service to the client device, and
    the RUI request is transmitted from the client device to the server via the URL.

10. The RUI providing apparatus of claim 8, wherein the RUI request further comprises control UI option information to request transmission of the RUI in which a user interface to control reproduction of the video is removed.

11. The RUI providing apparatus of claim 8, wherein the transmitting unit transmits a hyper text markup language (HTML) document indicating the RUI to the client device, and
    the HTML document further comprises link information comprising format information regarding another RUI corresponding to a URL in the form of a link comprised in the HTML document, and format information regarding a video comprised in the another RUI.

12. The RUI providing apparatus of claim 8, wherein the transmitting unit transmits a hyper text markup language (HTML) document indicating the RUI to the client device, and
    the HTML document further comprises subtitle display information indicating whether to display subtitles with respect to the video.

13. The RUI providing apparatus of claim 8, wherein, if the transmission option information is 0, the comparing unit only compares the format of the RUI with the first preference format information, the transmitting unit transmits the corresponding RUI to the client device when the format of the RUI matches the first preference format information, and
    wherein if the transmission option information is 1, the comparing unit compares the format of the RUI and the format of the video with the first preference format information and the second preference format information, respectively, the transmitting unit transmits the corresponding RUI to the client device when the format of the RUI matches the first preference format information, and the format of the video matches the second preference format information.

* * * * *